United States Patent Office 3,506,736
Patented Apr. 14, 1970

3,506,736
THERMOSETTING RESINS FROM POLYEPOXIDES, UNSATURATED POLYESTERS AND ETHYLENICALLY UNSATURATED CARBOXYLIC ACIDS
Daniel J. Najvar, Lake Jackson, Tex., assignor to The Dow Chemical Company, Midland, Mich., a corporation of Delaware
No Drawing. Filed Dec. 12, 1966, Ser. No. 600,788
Int. Cl. C08g 45/14, 45/04
U.S. Cl. 260—835                                   15 Claims

ABSTRACT OF THE DISCLOSURE

Thermosetting resin compositions are prepared by reacting an unsaturated carboxylic acid and a polyepoxide with an unsaturated polyester. The resins may be mixed with a polymerizable monomer and have excellent wettability for glass fibers and other inert fillers. The resins have improved properties over conventional polyesters both from a handling and fabrication standpoint as well as from the physical properties of the cured articles.

This invention relates to a process for producing novel thermosetting resin compositions, the resin compositions and articles produced therefrom. More particularly, it relates to resin compositions prepared by reacting an ethylenically unsaturated carboxylic acid and a polyepoxide with an unsaturated polyester resin. The resin may be admixed with a polymerizable monomer containing $>C=CH_2$ groups.

One of the objects of the present invention is to provide thermosetting resin compositions which will have application in the reinforced plastic field. Another object is to provide resin compositions particularly useful in wet lay-up fabrication of reinforced articles, in matched die molding, and in self extinguishing applications. A further object is to provide novel resin compositions which, when cured with a free radical yielding catalyst, impart excellent tensile and flexural strength and solvent resistance to the cured article. These and other objects of the invention will be apparent from the description below.

Thermosetting resin compositions of the present invention are prepared by adding to an unsaturated polyester a mixture of an ethylenically unsaturated carboxylic acid and a polyepoxide, and heating. The polyepoxide is usually present in an amount sufficient to provide 0.8 to 1.2 equivalents of epoxide per equivalent of carboxylic acid (—COOH) present in the unsaturated carboxylic acid. The said polyester may constitute from 5 to 95 percent of the total weight of polyester and reactants. Advantageously, a catalyst to promote the epoxide-carboxylic acid reaction may be present. Such catalysts include the well known amines such as 2,4,6-tri(dimethylaminomethyl)-phenol, amine salts, quaternary ammonium hydroxides and quaternary ammonium salts. The reaction may be conducted over a wide temperature range but preferably in the range of 60° to 130° C. Heating is continued until the percent acid concentration (as —COOH) is reduced to about 1 to 10 percent by weight. After cooling, the resin may be blended with an interpolymerizable monomer containing $>C=CH_2$ groups. Preferably the monomer is present in amounts varying up to 70 percent by weight of the combined weight of monomer and resin.

Of additional advantage in the preparation of these thermosetting resin compositions is the addition of a polymerization inhibitor. Many such inhibitors are well known to the art and include hydroquinone, t-butyl catechol, 2,5-di-t-butylquinone and the like and are usually employed in the concentration range of about 0.005 to about 0.1 percent by weight of reactants.

In the practice of this invention, a wide selection of unsaturated polyesters is readily available or can be prepared by methods well known to the art. Generally, in the preparation of suitable polyesters, an $\alpha,\beta$-ethylenically unsaturated dicarboxylic acid such as maleic acid, fumaric acid, itaconic acid or the like is interesterified with an alkylene glycol or polyalkylene glycol having a molecular weight of up to 2000 or thereabouts. Frequently, dicarboxylic acids free of ethylenic unsaturation such as phthalic acid, isophthalic acid, tetrabromophthalic acid, chlorendic acid, adipic acid, succinic acid and the like may be employed within a molar range of 0.25 to as much as 15 moles per mole of the $\alpha,\beta$-unsaturated dicarboxylic acid. It will be understood that the appropriate acid anhydrides when they exist may be used and usually are preferred when available.

The glycol or polyhydric alcohol component of the polyester is usually stoichiometric or in slight excess with respect to the sum of the acids. The excess of polyhydric alcohol seldom will exceed 20–25 percent and usually is about 10 to 15 percent.

These unsaturated polyesters may be generally prepared by heating a mixture of the polyhydric alcohol with the dicarboxylic acid or anhydride in the proper molar proportions at elevated temperatures, usually at about 150° to 250° C. for a period of time ranging from about 1 to 10 hours. Polymerization inhibitors such as t-butyl catechol may be advantageously added. It is also possible to prepare unsaturated polyesters directly from the appropriate oxide rather than the glycol, e.g., propylene oxide can be used in place of propylene glycol.

Preferred unsaturated polyesters for the practice of the present invention are prepared by reacting between about 10 to 25 percent molar excess of an alkylene glycol having the formula

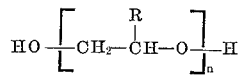

wherein R is H or a lower alkyl group and n is an integer from 1 to 4 with a mixture comprising about 1 to 4 parts by weight of an $\alpha,\beta$-unsaturated dicarboxylic acid or anhydride and about 4 to 1 parts by weight of a dicarboxylic acid or anhydride without ethylenic unsaturation. The condensation is effected at about 200° C. and continued until the acid content drops to about 2 to 12 percent. The polyester may then be cooled and admixed with a polymerizable monomer containing $>C=CH_2$ groups.

Other unsaturated polyesters can be made using alkylene glycols having the formula

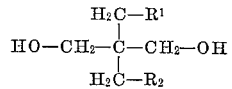

wherein $R_1$ and $R_2$ are selected from hydrogen, a lower alkyl group or a halogen.

When isophathalic unsaturated polyesters are prepared, it is advantageous to use a split glycol technique, e.g., the isophthalic acid is reacted with an amount of glycol sufficient to lower the carboxyl content rapidly, then the unsaturated dicarboxylic acid and the remainder of the glycol is added and the reaction continued to the desired percent —COOH. It is well known in the art that temperatures greater than 225° C. are advantageous when producing these isophthalic polyesters.

Any of the known polyepoxides can be employed in the preparation of the thermosetting resins of this invention. Useful polyepoxides are glycidyl polyethers of both polyhydric alcohols and polyhydric phenols, flame retardant epoxy resins based on tetrabromo bisphenol A, epoxy novolacs, epoxidized fatty acids or drying oil acids, epoxidized diolefins, epoxidized di-unsaturated acid esters as well as epoxidized unsaturated polyesters, so long as they contain more than one epoxide group per molecule. The polyepoxides may be monomeric or polymeric.

Within the scope of this invention, a number of polyepoxide modifications can be readily made. It is possible to increase the molecular weight of the polyepoxide by polyfunctional reactants which react with the epoxide group and serve to link two or more polyepoxide molecules. A dicarboxylic acid, for example, can be reacted with a diepoxide, such as the diglycidyl ether of a bisphenol, in such a manner so as to join two or more diepoxide molecules and still retain terminal epoxide groups. Other polyfunctional reactants include diisocyanates, dicarboxylic acid anhydrides and those reactants which contain functional groups which will react with the epoxide group.

Where polyhydric phenols are selected to prepare the polyepoxide, many structural embodiments are possible. Polyepoxides prepared from polyhydric phenols may contain the structural group

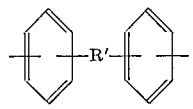

where R' is a divalent hydrocarbon radical such as

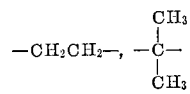

and the like, or R' is

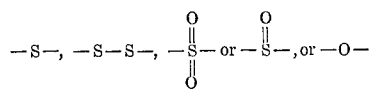

The choice of novolac resins leads to a separate well recognized class of epoxy novolac resins. Other modifications are well known to those skilled in the art.

The polyepoxides referred to as epoxidized diolefins, epoxidized fatty acids, etc. are generally made by the known peracid method where the reaction is one of epoxidation of compounds with isolated double bonds at a controlled temperature so that the acid resulting from the peracid does not react with the resulting epoxide group to form ester linkages and hydroxyl groups. Preparation of polyepoxides by the peracid method is described in various periodicals and patents and such compounds as butadiene, ethyl linoleate, polyunsaturated drying oils or drying oil esters can all be converted to polyepoxides.

While the invention is applicable to epoxides generally, preferred polyepoxides are glycidyl polyethers of polyhydric alcohols or polyhydric phenols having weights per epoxide group of 150 to 2000. These polyepoxides are usually made by reacting at least about two moles of an epihalohydrin or glycerol dihalohydrin with one mole of the polyhydric alcohol or polyhydric phenol, and a sufficient amount of a caustic alkali to combine with the halogen of the halohydrin. The products are characterized by the presence of more than one epoxide group, i.e., a 1,2-epoxy equivalency greater than one.

The ethylenically unsaturated carboxylic acids useful in preparing the resin compositions of this invention include the α,β-unsaturated monocarboxylic acids such as acrylic acid, methacrylic acid, the halogenated acrylic or methacrylic acids, cinnamic acid and the like and mixtures thereof, and the hydroxyalkyl acrylate or methacrylate half esters of dicarboxylic acids wherein the hydroxyalkyl group preferably has from 2 to 6 carbon atoms. The dicarboxylic acids may be of both the ethylenic unsaturated type and those without ethylenic unsaturation. Preferably, the half ester is prepared by reacting substantially equal molar proportions of a hydroxyalkyl acrylate or methacrylate with a dicarboxylic acid anhydride. Advantageously, a polymerization inhibitor, such as hydroquinone, may be added since elevated temperatures are useful in preparing the half esters.

Dicarboxylic acid anhydrides containing ethylenic unsaturation suitable for preparing the half esters include maleic anhydride, the halogenated maleic anhydrides, citraconic anhydride, itaconic anhydride and the like and mixtures thereof. The saturated dicarboxylic acid anhydrides include phthalic anhydride, tetrabromophthalic anhydride, chlorendic anhydride, anhydrides of aliphatic unsaturated dicarboxylic acids and the like.

While the half esters useful in preparing the thermosetting resins are preferably prepared from the dicarboxylic acid anhydrides, those skilled in the art will recognize that useful half esters may be prepared from dicarboxylic acids by well known esterification procedures. Useful dicarboxylic acids also include fumaric acid, halogenated fumaric acids, mesaconic acid, adipic acid, succinic acid and the like as well as the acids of the corresponding anhydrides previously cited.

A wide selection of polymerizable monomers containing the $>C=CH_2$ group is available from the many known classes of vinyl monomers. Representative species are the vinyl aromatic compounds which include such monomers as styrene, vinyl toluene, halogenated styrenes, divinyl benzyne and the like.

Other valuable monomers include the methyl, ethyl, isopropyl, octyl, etc. esters of acrylic acid or methacrylic acid; vinyl acetate, diallyl maleate, dimethallyl fumarate; acidic monomers such as acrylic acid, methacrylic acid and the like; and amide monomers such as acrylamide, N-alkyl acrylamides and the like and mixtures thereof.

Preferred polymerizable monomers containing the $$>C=CH_2$$

group are styrene, vinyl toluene, ortho-, meta- and para-halo styrenes, vinyl naphthalene, the various alpha-substituted styrenes, as well as the various di-, tri- and tetra-halo styrenes, and acrylic, methacrylic and crotonic acid esters which include both the saturated alcohol esters and the beta-hydroxyalkyl esters.

According to the present invention, the curing of the resin compositions is effected by the application of heat and/or pressure in the presence of a free radical yielding catalyst. Catalysts that may be used for the curing or polymerization are preferably the peroxide catalysts such as benzoyl peroxide, lauroyl peroxide, t-butyl hydroperoxide, methyl ethyl ketone peroxide, t-butyl perbenzoate, potassium persulfate and the like. The amount of the catalyst added will vary preferably from 0.1 percent to about 5 percent by weight of reactants. Temperatures employed may vary over a considerable range but usually are in the range of 40° to 300° C.

Additionally, more rapid curing of the thermosetting resin compositions may be accomplished by the addition of accelerating agents such as lead or cobalt naphthenate, dimethyl aniline and the like usually in concentrations ranging from 0.1 to 5.0 weight percent.

The thermosetting resin compositions of this invention are useful in the manufacture of pottings, castings, laminates and a variety of reinforced plastic articles. Said compositions wet glass, fibers and fillers rapidly, and are easy to handle and apply. The rapid wetting of fillers provide improved holding capacity for a variety of fillers and reinforcing media as well as produce articles with smooth surfaces and excellent tensile and flexural properties. The resin compositions can be readily formulated to a thixotropic state by the incorporation of silica aerogel or expanded silicate and other such agents well known to the art. In addition to the aforesaid additives, other materials such as pigments, light stabilizers, mold release agents, etc. can be readily admixed.

To illustrate the present invention more fully, the following non-limiting examples are given.

EXAMPLE 1

An unsaturated polyester was prepared by charging 900 grams of phthalic anhydride, 300 grams of maleic anhydride and 760 grams of propylene glycol to a five liter flask equipped with a stirrer, partial condenser, temperature control, a means for purging and sampling, etc. The reactants were heated to 200° C. over a three hour period and maintained thereat until the acid concentration, as —COOH, reached about 6 percent. Then the resin was cooled and 0.52 gram of hydroquinone was added at 110° C.

To the above-prepared polyester was then added at 110° C. 275 grams of DMP–30 (2,4,6-tri(dimethylaminomethyl)phenol), 618 grams of the maleic anhydride half ester of beta-hydroxyethyl acrylate and 550 grams of a diglycidyl ether of 4,4'-isopropylidene diphenol having an epoxide equivalent weight of from 186 to 192. The temperature was raised to 115° C. until the acid concentration, as —COOH, dropped to about 2.9 percent. The resin was then blended with 2000 grams of styrene.

Additional styrene was blended with a portion of the above resin to give about a 45 percent by weight concentration of styrene and a clear casting made by adding and curing with 0.3 percent by weight cobalt naphthenate and 1.5 percent by weight methyl ethyl ketone peroxide. The casting was cured at 80° C. for 18 hours and then at 250° F. for 45 minutes with the resulting physical properties:

Flexural strength—16,000 p.s.i.
Flexural modulus—5.2×10$^5$ p.s.i.
Tensile strength—8000 p.s.i.
Percent elongation—1.6%.
Heat distortion temperature—170° F.
24 hr. H$_2$O absorption—0.23 wt. percent.
24 hr. toluene absorption—0.17 wt. percent.
Flexural strength after 2 hr. H$_2$O boil—14,000 p.s.i.
Flexural modulus after 2 hr. H$_2$O boil—4.9×10$^5$ p.s.i.

Similar results can be obtained when equivalent amounts of the following half esters are substituted for the beta-hydroxyethyl acrylate half ester of maleic anhydride: beta-hydroxyethyl methacrylate half ester of maleic anhydride; beta-hydroxypropyl acrylate half ester of maleic anhydride; beta-hydroxyethyl acrylate half ester of phthalic acid.

Another portion of the above resin was adjusted to 50 percent by weight styrene; a mixture was prepared consisting of 38.5 weight percent of said resin, 60 weight percent of a kaolin clay, 1 weight percent of benzoyl peroxide and ½ weight percent of a mold release agent. The filled resin was then molded with 26 percent by weight of a continuous strand glass mat in the form of a 21 inch tray at 270°–280° F. The flexural strength of this tray was 21,600 p.s.i. and its flexural modulus was 15.8×10$^5$ p.s.i. The viscosity of this resin-clay mix was 3,500 to 5000 cps. at 20 and 100 r.p.m. respectively using a No. 6 spindle on a model RVT Brookfield viscometer at 75° F.

EXAMPLE 2

By the same procedure as in Example 1, an unsaturated polyester was made from a mixture of 588 grams of maleic anhydride, 592 grams of phthalic anhydride and 684 grams of propylene glycol. After cooling to 85° C., the following were added:

| | Grams |
|---|---|
| Hydroquinone | 0.26 |
| DMP–30 | 0.76 |
| Beta-hydroxyethyl acrylate half ester of maleic anhydride | 310 |
| Diglycidyl ether of 4,4'-isopropylidene diphenol (having an epoxide equivalent weight of 172 to 176) | 253 |

The temperature was raised to about 113° C. and maintained thereat until the acid concentration (as —COOH) was reduced to 9.2 percent by weight. After cooling, 1330 grams of styrene were blended therewith. The viscosity of the resin composition at about a 40 percent by weight concentration of styrene was 230 centipoise at 24° C. and at a 45 percent by weight concentration of styrene, was 128 centipoise at 24° C.

A portion of this resin at a styrene concentration of 45 percent by weight was mixed with 1 percent by weight of an expanded silicate thixotropic agent which resulted in a viscosity of 312 centipoise at 24° C. after two days. This resin, when applied to a glass cloth (No. 181, Volan A finish), rapidly wetted and penetrated the glass cloth and showed no tendency to drain when the glass cloth was suspended in a vertical position for 30 minutes at room temperature.

A clear casting was made from a portion of this resin at a styrene concentration of 45 percent by weight by adding 0.3 percent by weight cobalt naphthenate and 1.5 percent by weight methyl ethyl ketone peroxide and curing for 18 hours at 80° C. and then for 45 minutes at 250° F. The physical properties of this casting were as follows:

Flexural strength—12,000 p.s.i.
Flexural modulus—5.25×10$^5$ p.s.i.
Tensile strength—6400 p.s.i.
Elongation—1.1%
Heat distortion temperature—194° F.
H$_2$O absorption (24 hrs.)—0.27 wt. percent
Toluene absorption (24 hrs.)—0.09 wt. percent Similar results can be obtained when vinyl toluene or methyl methacrylate is substituted for the styrene.

Another portion of this same resin was used to prepare a laminate from three plys of two ounce chopped strand glass. The laminate was prepared by conventional methods and prepared to contain about 36 percent by weight of chopped strand glass. The laminate was cured by the addition of 0.5 percent by weight cobalt naphthenate and 1.5 percent by weight methyl ethyl ketone peroxide to the resin composition and heating the laminate at 80° C. for 18 hours followed by one hour at 250° F. The cured laminate had a flexural strength of 31,500 p.s.i. and a flexural modulus of 11.6×10$^5$ p.s.i.

EXAMPLE 3

By the same procedure as in Example 1, an unsaturated polyester was made from a mixture of 900 grams of phthalic anhydride, 355 grams of fumaric acid and 760 grams of propylene glycol. When the percent acid reached 4 percent by weight (as —COOH), the resin was cooled and 0.52 gram of hydroquinone added. When further cooled to 100° C., the following were added:

| | Grams |
|---|---|
| DMP–30 | 2.75 |
| Beta-hydroxyethyl acrylate half ester of maleic anhydride | 618 |
| Diglycidyl ether of 4,4'-isopropylidene diphenol (having an epoxide equivalent weight of 186 to 192) | 550 |

The temperature was raised to 120° C. and maintained thereat until the acid concentration dropped to 4.2 percent by weight (as —COOH). After cooling, 2000 grams of styrene were added and blended. At a concentration of 45 percent by weight styrene, the resin composition had a viscosity of 160 centipoise at 24° C.

When a portion of the resin at a concentration level of 45 percent by weight styrene was mixed with 1.1 percent by weight of a thixotropic agent, the composition had a viscosity of 210 centipoise at 24° C. By tests similar to those used in Example 2, the resin showed rapid wetting and penetration of glass cloth and no tendency to drain.

A clear casting was made from a portion of this same resin by curing with 0.3 percent by weight cobalt naphthenate and 1.5 percent by weight methyl ethyl ketone peroxide at 80° C. for 18 hours and then 250° F. for 45 minutes. The following physical properties were found:

Flexural strength—12,600 p.s.i.
Flexural modulus—5.13×10⁵ p.s.i.
Tensile strength—8400 p.s.i.
Elongation—1.6%
Heat distortion temperature—170° F.

EXAMPLE 4

By the same procedure as in Example 1, an unsaturated polyester was made from a mixture of 900 grams of phthalic anhydride, 300 grams of maleic anhydride and 760 grams of propylene glycol. When the acid concentration was 6.0 percent by weight (as —COOH), the mixture was cooled and 0.54 gram of hydroquinone added. After further cooling to 90° C., the following were added:

|  | Grams |
|---|---|
| DMP–30 | 2.75 |
| Acrylic acid | 347 |
| Diglycidyl ether of 4,4'-isopropylidene diphenol having an epoxide equivalent weight of 186–192) | 821 |

The reaction mixture was maintained at 120° C. until the acid concentration reached 3.9 percent by weight (as —COOH) and after cooling, 2000 grams of styrene were added and blended. At a 43 percent by weight styrene concentration, the resin had a viscosity of 192 centipoise at 24° C.

When a portion of the above resin was adjusted to 45 percent by weight styrene and cured with 0.3 percent by weight cobalt naphthenate and 1.5 percent by weight methyl ethyl ketone peroxide at 80° C. for 18 hours and then at 250° F. for 45 minutes, the clear casting had the following physical properties:

Flexural strength—12,500 p.s.i.
Flexural modulus—5.0×10⁵ p.s.i.
Tensile strength—9100 p.s.i.
Elongation—1.73%
Heat distortion temperature—153° F.

Similar results can be obtained when an equivalent amount of methacrylic acid is substituted for the acrylic acid.

Another portion of this same resin containing 1.1 percent by weight of a thixotropic agent was used to prepare a three ply laminate from 1.5 ounce chopped strand glass. The laminate was prepared by conventional methods and prepared to contain about 30 percent by weight of chopped strand glass. Using the same weight percent curing agents as above, the laminate was cured at 80° C. for 18 hours and then at 250° F. for one hour. The laminate had the following physical properties:

Flexural strength—19,500 p.s.i.
Flexural modulus—7.4×10⁵ p.s.i.
Tensile strength—15,400 p.s.i.
Elongation—1.3%
Flexural strength (2 hour H₂O boil)—19,200 p.s.i.
Flexural modulus (2 hour H₂O boil)—7.0×10⁵ p.s.i.

EXAMPLE 5

By the same procedure as in Example 1, an unsaturated polyester was prepared from 695 grams of phthalic anhydride, 464 grams of maleic anhydride and 800 grams of propylene glycol. When the acid content reached 6.5 percent, the reaction mixture was cooled and mixed with 0.66 gram of hydroquinone, 3.0 grams DMP–30, 347 grams of acrylic acid and 821 grams of a diglycidyl ether of 4,4'-isopropylidene diphenol having an epoxide equivalent weight of 186–192. The mixture was then heated at 120° C. until the acid content was 3.6 percent and then cooled.

A portion of the above resin was adjusted to a styrene concentration of 45 percent by weight and then mixed with 1 percent by weight benzoyl peroxide and 0.5 percent by weight of a mold release agent. Four tests were made with this resin in which an inert filler was admixed with the resin. The fillers used were calcium carbonate and three different examples of commercially available clay fillers available under the names Hydrite R, McNamee Clay and ASP–400. The formulations, even at high filler levels, had sufficiently low viscosities to be easily molded with glass mat in a 250 ton matched die molding press. The results of these tests are summarized below.

|  | Ex. 5a | Ex. 5b | Ex. 5c | Ex. 5d |
|---|---|---|---|---|
| Filler, initial filler level (percent by weight) | Calcium carbonate, 65% | Hydrite R, 55% | McNamee clay, 55% | ASP–400, 50% |
| Flexural strength, p.s.i. | 28,100 | 29,200 | 27,300 | 29,800 |
| Flexural modulus ×10⁵ | 17.6 | 19.3 | 19.7 | 17.0 |
| Tensile strength, p.s.i. | 12,200 | 13,300 | 12,000 | 14,100 |
| Percent elongation | 1.68 | 1.82 | 1.5 | 1.82 |
| Percent glass (by wt.) | 25 | 30 | 30 | 30 |

Similar results can be obtained when the acrylic acid is replaced with a maleate half ester of beta-hydroxyethyl acrylate; or when the polyester is prepared to include hydroxy isobutyric acid.

EXAMPLE 6

By the same procedure as in Example 1, a self-extinguishing unsaturated polyester was prepared from 695 grams of a dibromo-neopentyl glycol having a molecular weight of 262 and a bromine content of 61.2 percent, 130 grams of maleic anhydride and 196 grams of phthalic anhydride. The mixture was reacted at 200° C. until the acid content was 4.6 percent. The temperature was then lowered to 120° C. and 0.25 gram of hydroquinone, 1.0 gram of DMP–30, 395 grams of the polyepoxide used in Example 4, and 141 grams of acrylic acid were added. The mixture was maintained at 110° C. until the acid content was 3.6 percent. The resin was then cooled and blended with styrene.

A clear casting of this resin (38 percent by weight styrene) was prepared using 1% benzoyl peroxide and cured as before with the following properties:

Flexural strength—17,400 p.s.i.
Flexural modulus×10⁵—5.2
Tensile strength—7900 p.s.i.
Percent elongation—1.5
Heat distortion (at 264 p.s.i.)—190° F.
Flexural strength (after 2 hr. H₂O boil)—15,000 p.s.i.
Flexural modulus (after 2 hr. H₂O boil)—4.9×10⁵

Three portions of the resin were adjusted to different styrene concentrations, cured as before and tested for self-extinguishing properties by the Globar burn rate test (ASTM D–757–49).

|  | Percent by weight styrene | Percent by weight bromine | Globar burn rate, in./min. |
|---|---|---|---|
| Ex. 6a | 30 | 19.9 | 0.124 |
| Ex. 6b | 35 | 18.45 | 0.120 |
| Ex. 6c | 40 | 17.0 | 0.135 |

Self-extinguishing properties were also obtained by using a polyepoxide based on tetrabromo bisphenol A and/or by the addition of phosphorus compounds, antimony oxide and the like.

EXAMPLE 7

To a five liter flask, as described in Example 1, was charged 786 grams of isophthalic acid and 855 grams of dipropylene glycol. The temperature was raised to 240° C. until the percent —COOH reached 5.4%. The mix was cooled to 230° C. and 520 grams of maleic anhydride and 286 grams of ethylene glycol was added. The reaction was continued until the percent —COOH reached 3.4%. The resin was then cooled to 110° C. and the following added to the reaction mixture.

| | Grams |
|---|---|
| Hydroquinone | 0.66 |
| DMP–30 | 3.4 |
| DER–331 diglycidyl ether of 4,4'-isopropylidene diphenol having an epoxide equivalent weight of 186–192 | 687 |
| Beta-hydroxy ethyl acrylate half ester of maleic anhydride | 763 |

The resin mixture was heated to 120° C. until the percent —COOH reached 2.2%. The resin was cooled and blended with 1940 grams of styrene monomer.

A portion of this resin was adjusted to 45% styrene and a clear casting made using 1% benzoyl peroxide. The casting was cured for 18 hours at 80° C. then 45 minutes at 250° F. The casting had the following physical properties at room temperature.

Flexural strength—19,200 p.s.i.
Flexural modulus—$4.8 \times 10^5$ p.s.i.
Tensile strength—11,200 p.s.i.
Percent elongation—3.2
Heat distortion temperature (264 p.s.i.)—178° F.

Another portion of this same resin was diluted to 45% styrene monomer and mixed with 60% Hydrite R kaolin clay and another portion with 60% McNamee kaolin clay fillers. Each of the mixes contained 0.5% Zelec UN mold release and 0.6% of USP–245, a peroxide type catalyst from U.S. Peroxygen.

The viscosities of these mixes were determined using a No. 6 spindle in a model RVT Brookfield viscometer at 73° F.

| Filler type | R.p.m. No. 6 Spindle | Viscosity, centipoise |
|---|---|---|
| Hydrite R | 50 | 9,600 |
| Do | 20 | 10,000 |
| Do | 10 | 11,000 |
| Do | 5 | 13,200 |
| McNamee | 50 | 14,400 |
| Do | 20 | 16,000 |
| Do | 10 | 18,000 |
| Do | 5 | 22,400 |

Another portion of this resin was adjusted to 40% styrene monomer and mixed with 65% calcium carbonate, 0.5% Zelec UN mold release and 0.5% USP–245. A No. 6 spindle in a model RVT Brookfield viscometer was used to determine the viscosity of this mix at 75° F.

| R.p.m. No. 6 spindle: | Viscosity, centipoises |
|---|---|
| 100 | 7,000 |
| 50 | 7,800 |
| 20 | 9,500 |
| 10 | 10,500 |
| 5 | 14,600 |

In the preparation of the resin compositions of this invention, the acid concentration can be varied, preferably within the range from about 1 percent to about 12 percent by weight (as —COOH). For matched die molding, it is preferred to prepare a resin with an acid content within the lower half of this range. Additionally, when the intended use concerns wet hand lay-up, wet spray-up or filament winding, it is preferred to prepare a resin with an acid content within the middle portion (4–8%) of this range.

As previously indicated and exemplified, a variety of inert additives can be readily admixed where desired to provide plasticity, color, variations in cured properties and the like. Likewise, other reactive components may also be included with the thermosetting resins to produce particular properties and characteristics without departing from the principles of the present invention, components such as other compatible polymerizable or thermosetting resins, dicarboxylic acids or their anhydrides when they exist, thickening agents and mixtures thereof.

While preferred embodiments of the invention have been disclosed, various modifications may be made therein without departing from the scope of the invention as set forth in the claims.

I claim:
1. A process for preparing thermosetting resins which comprises:
(A) mixing an unsaturated polyester having an acid content, as —COOH, of about 2 to 12 weight percent wherein said polyester was prepared by interesterification of a glycol with an unsaturated dicarboxylic acid, anhydride thereof, mixtures of same or mixtures of same with a saturated dicarboxylic acid or anhydride thereof, a polyepoxide and an ethylenically unsaturated carboxylic acid; said mixture containing about 0.8 to about 1.2 equivalents of the polyepoxide per equivalent of the carboxylic acid and from 5 to 95 percent by weight of the polyester, based on the total weight of reactants,
(B) heating the mixture at a temperature from about 60° to about 130° C. until the percent acid content, as —COOH, is reduced to about 1 percent to about 12 percent, and
(C) blending therewith a polymerizable unsaturated monomer containing $>C=CH_2$ groups; said monomer constituting up to 70 percent by weight of the combined weight of resin reactants and monomer.

2. A process for preparing thermosetting resins which comprises:
(A) mixing an unsaturated polyester having an acid content, as —COOH, of about 2 to 12 weight percent wherein said polyester was prepared by interesterification of a glycol with an unsaturated dicarboxylic acid, anhydride thereof, mixtures of same or mixtures of same with a saturated dicarboxylic acid or anhydride thereof, a polyepoxide and an ethylenically unsaturated carboxylic acid selected from the group consisting of $\alpha,\beta$-ethylenically unsaturated monocarboxylic acids, hydroxyalkyl acrylate and hydroxyalkyl methacrylate half esters of dicarboxylic acids wherein the hydroxyalkyl group contains from two to six carbon atoms; said mixture containing about 0.8 to about 1.2 equivalents of the polyepoxide per equivalent of the carboxylic acid from 5 to 95 percent by weight of the polyester, based on the total weight of the reactants,
(B) heating the mixture at a temperature from about 60° to about 130° C. until the percent acid content, as —COOH, is reduced to about 1 percent to about 12 percent, and
(C) blending therewith a polymerizable unsaturated monomer containing $>C=CH_2$ groups; said monomer constituting up to 70 percent by weight of the combined weight of resin reactants and monomer.

3. The process of claim 2 wherein the polyepoxide is a glycidyl polyether of a polyhydric alcohol or a polyhydric phenol.

4. The process of claim 3 wherein the polyepoxide is a diglycidyl ether of 4,4'-isopropylidene diphenol.

5. The process of claim 2 wherein the unsaturated monocarboxylic acid is acrylic or methacrylic acid.

6. The process of claim 2 wherein the half ester is a phthalic acid half ester or a maleic acid half ester.

7. The process of claim 2 wherein the monomer is selected from the group consisting of vinyl aromatic monomers, hydroxyalkyl esters of acrylic and methacrylic acid, alkyl esters of acrylic and methacrylic acid, acrylic acid and methacrylic acid.

8. Thermosetting resin composition which comprises:
(A) at least 30 percent by weight of the product of the reaction of a mixture of (1) an unsaturated polyester having an acid content, as —COOH, of about 2 to 12 weight percent wherein said polyester was prepared by interesterification of a glycol with an unsaturated dicarboxylic acid, anhydride thereof, mixtures of same or mixtures of same with a saturated dicarboxylic acid or anhydride thereof, (2) a polyepoxide, and (3) an ethylenically unsaturated carboxylic acid; said mixture containing about 0.8 to about 1.2 equivalents of the polyepoxide per equivalent of the carboxylic acid and from 5 to 95 percent by weight of the polyester, based on the total weight of reactants, and (B) up to 70 percent by weight of a polymerizable unsaturated monomer containing >C=CH$_2$ groups.

9. Thermosetting resin composition which comprises:
(A) at least 30 percent by weight of the product of the reaction of a mixture of (1) an unsaturated polyester having an acid content, as —COOH, of about 2 to 12 weight percent wherein said polyester was prepared by interesterification of a glycol with an unsaturated dicarboxylic acid, anhydride thereof, mixtures of same or mixtures of same with a saturated dicarboxylic acid or anhydride thereof, (2) a polyepoxide, and (3) an ethylenically unsaturated carboxylic acid selected from the group consisting of α,β-ethylenically unsaturated monocarboxylic acids, hydroxyalkyl acrylate and hydroxyalkyl methacrylate half esters of dicarboxylic acids wherein the hydroxyalkyl group contains from two to six carbon atoms; said mixture containing about 0.8 to about 1.2 equivalents of the polyepoxide per equivalent of the carboxylic acid and from 5 to 95 percent by weight of the polyester, based on the total weight of the reactants, and (B) up to 70 percent by weight of a polymerizable unsaturated monomer containing >C=CH$_2$ groups.

10. The composition of claim 9 wherein the polyepoxide is a glycidyl polyether of a polyhydric alcohol or a polyhydric phenol.

11. The composition of claim 10 wherein the polyepoxide is a diglycidyl ether of 4,4'-isopropylidene diphenol.

12. The composition of claim 9 wherein the unsaturated monocarboxylic acid is acrylic or methacrylic acid.

13. The composition of claim 9 wherein the half ester is a phthalic acid half ester or a maleic acid half ester.

14. The composition of claim 9 wherein the monomer is selected from the group consisting of vinyl aromatic monomers, hydroxyalkyl esters of acrylic and methacrylic acid, alkyl esters of acrylic and methacrylic acid, acrylic acid and methacrylic acid.

15. A resin which comprises essentially the polymerized composition of claim 9.

References Cited
UNITED STATES PATENTS

| | | | |
|---|---|---|---|
| 3,301,743 | 1/1967 | Fekete | 260—837 |
| 3,317,465 | 5/1967 | Doyle | 260—836 |
| 3,373,075 | 3/1968 | Fekete | 260—837 |
| 3,373,221 | 3/1968 | May | 260—835 |
| 3,377,406 | 4/1968 | Newey | 260—837 |
| 3,378,601 | 4/1968 | Tanaka | 260—837 |
| 3,377,406 | 4/1968 | Newey | 260—837 |
| 3,408,422 | 10/1968 | May | 260—837 |
| 3,420,914 | 1/1969 | May | 260—837 |

MURRAY TILLMAN, Primary Examiner

P. LIEBERMAN, Assistant Examiner

U.S. Cl. X.R.

260—836, 837, 78.4, 37, 41, 40